Patented Sept. 7, 1954

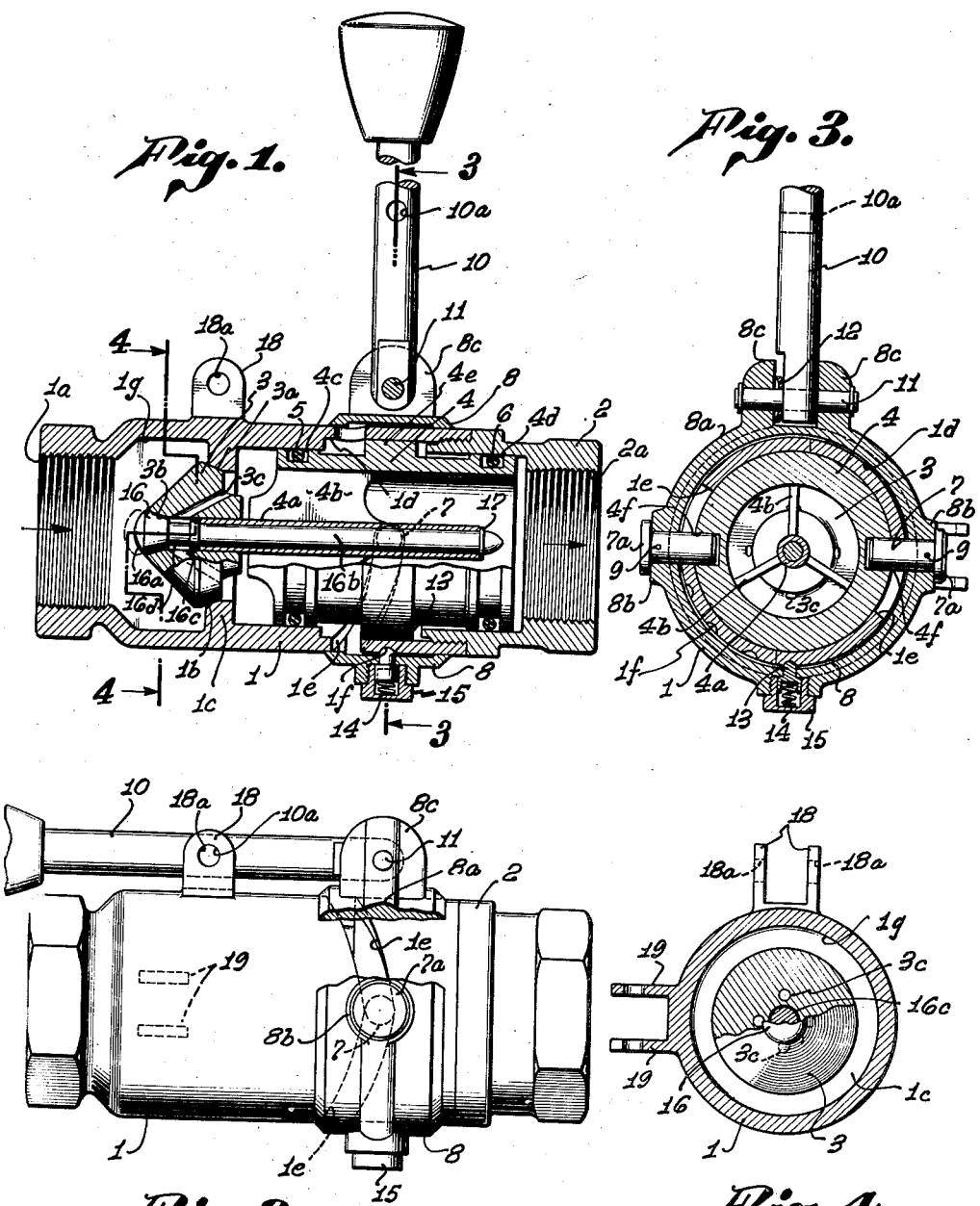

2,688,340

UNITED STATES PATENT OFFICE 2,688,340

PRESSURE EQUALIZING VALVE WITH PIVOTALLY MOUNTED OPERATOR

Theodore A. Stehlin, Upland, Calif., assignor to St-West, Inc., Carson City, Nev., a corporation of Nevada Application January 13, 1949, Serial No. 70,706

2 Claims. (Cl. 137—630.14)

My invention relates to a valve structure, primarily adapted for controlling liquids in pipe lines.

One of the principal objects of this invention is to provide a valve structure having simple and effective means for operating the valve element or elements in the interior of the valve casing from the exterior thereof.

An important object of this invention is to provide a novel and simple handle for opening, closing, and otherwise operating the valve, which may be easily and quickly shifted into operative or into an out-of-the-way position, and means in connection therewith for securing the handle in either position.

An important object also of this invention is to provide a valve structure in which the valve element is so mounted that it may directly engage its valve seat with no, or a minimum of, rotary or lateral movement, even though it is rotatably or otherwise movably connected to the valve actuating member, and particularly in which a poppet valve, which is axially rotatably carried on a valve actuating member, may be seated without rotary movement with respect to its seat.

A further important object of this invention is to provide a valve structure which is particularly designed for controlling fluid under high pressure, and in which the fluid controlling valve element may be readily moved from its closed or seated position, to relieve the pressure or to open the valve to permit flow of fluid therethrough, by initially relieving the pressure in the system ahead of the valve by means of a secondary, or cracking, or pressure-breaking valve which is operated by the same means employed for opening or controlling the principal valve of the valve structure.

A still further important object of this invention is to provide a novel and simple embodiment of a secondary or cracking valve within the principal fluid control valve.

With these and other objects in view as will appear hereinafter, I have devised a valve structure having certain novel features of construction, combination, and arrangement of parts and portions, as will be hereinafter described in detail, and particularly set forth in the appended claims, reference being had to the accompanying drawings and to the characters of reference thereon, which form a part of this application, in which:

Fig. 1 is a longitudinal sectional view of a valve structure embodying my invention, portions thereof being shown in elevation;

Fig. 2 is a side elevational view of my valve with the operating handle shifted to an out-of-the-way position, portions being broken away and in section to facilitate the illustration;

Fig. 3 is a fragmentary transverse sectional view, taken through 3—3 of Fig. 1; and, Fig. 4 is a transverse sectional view, taken through 4—4 of Fig. 1.

My valve structure, as shown in the drawings, is housed in a cylindrical casing or housing which consists of a body or cylindrical casing 1 and a cylindrical casing or head 2, these casing members being screwably connected end to end. These casing members have threaded ends or connecting means 1a and 2a for connecting the valve structure to pipes, not shown.

Within and intermediate the ends of the casing member 1 is an annular valve seal 1b provided at the forward end of an inwardly extending collar or flange 1c, the seat being conical and diverging forwardly. A valve member 3, which will be referred to herein as a poppet valve, is adapted to engage, with its conical valve portion 3a, the seat 1b. The axial portion of the valve member is rotatably mounted at the forward end portion of a hollow stem 4a of a cylindrical actuating member 4.

The actuating member 4 is substantially a sleeve which is reciprocally and rotatably mounted within the valve casing and supports, by means of radial webs 4b, the hollow stem 4a.

Near the opposite ends of the sleeve are annular grooves 4c and 4d in which are located sealing rings 5 and 6 in the form of resilient O-rings. Intermediate the ends of the sleeve is provided an enlarged annular portion or collar 4e, an enlarged annular space 1d being provided at the rear portion of the casing member 1 to receive the collar 4e and permit the reciprocation of the actuating member.

The reduced annular wall of the casing member 1, outwardly from the cylindrical recess 1d, has a pair of helical slots 1e through which extend radial pins 7, the inner ends of the pins removably extending into recesses 4f in the collar 4e. These pins are carried by a sleeve-like collar 8 which extends slidably around the casing member 1, and is arranged at all times to cover the helical slots 1e therein. The collar 8 has a central outwardly extending reinforcing flange 8a, and at the diametrically opposite portions thereof bosses 8b are aligned or interposed within the flange 8a. The pins 7 are mounted in the bosses and extend inwardly therefrom through the helical slots 1e and into the recesses 4f. These pins are held in position by smaller pins 9, and are provided at their outer ends with heads 7a to facilitate the removal of the pins 7.

At one side of the collar 8, and centrally between the bosses 8b thereof, are provided circumferentially spaced lugs 8c. On these lugs is carried the inner end of a valve-operating handle 10, the inner end of the handle being pivotally mounted by means of a pin 11 on these lugs, the axis of the pin 11 being positioned transversely with respect to the longitudinal axis of the valve casing. The handle 10 may be held in an operative position outwardly, that is, in a position radiating outwardly from the axis of the valve casing, by means of a friction-creating spring 12, which may be positioned on the pin 11 and located between one of the lugs and the handle 10. The purpose of the pivotal mounting of the handle will be hereinafter described.

The valve member 3 is adapted to be unseated by the rotation of the handle 10, which, when rotated, causes the pins 7 to slide in the helical slots or grooves 1e and impart a forward motion to the valve member 3 while the valve-actuating member is rotated. The limits of the rotary movement of the collar 8 and the handle 10 may be determined by the ends of the helical slots 1e. But intermediate positions of the valve member 3 may be determined by valve-locating recesses 1f located on the outer side of the casing member 1 under the collar 8. Into these recesses 1f may extend a spring-pressed plunger or detent 13 which may be positioned diametrically opposite the handle 10. As shown, this plunger or detent is urged inwardly by means of a spring 14 held in place by a cap 15.

My valve structure, as shown in the drawings, is provided with a cracking or pressure-breaking valve which consists primarily of a valve member 16 which is axially arranged with respect to the valve member 3 and the valve-actuating member 4. This valve is also a poppet valve having a valve portion 16a at its forward end and a long stem 16b at its rear portion, the stem extending the whole length of the hollow stem 4a of the actuating member and is axially fixed therein, the forward portion of the cracking-valve member 16 having a collar 16c which is held against the forward end of the hollow stem of the actuating member by a spring or other suitable retainer 17. The valve portion 16a is conical and is seated in a forwardly diverging conical seat 3b at the forward end of the valve member 3. The valve member 16 has an undercut portion 16d immediately behind the valve portion, whereby liquid passing through the valve structure may pass backwardly beyond the periphery of the valve portion into backwardly diverging passages 3c in the valve member 3 when the cracking-valve member 16 is positioned forwardly of the valve member 3.

The forward end of the cracking-valve member 16 merges substantially with the cone-shaped forward portion of the valve member 3 when the valve member 16 is in its closed position, this streamlined shape being conducive to free flow of the liquid rearwardly from the valve members by way of an enlarged annular portion 1g within the casing member 1 and thence around the periphery of the valve member 3 and through the collar 1c.

The initial operation of the valve causes the forward shifting of the cracking-valve member 16 which unseats the latter from the seat 3b at the forward end of the valve member 3, such movement being permitted by reason of an annular space between the rear end of the valve member 3 and the shoulder at the forward portion of the actuating member. This slight opening of the valve may be made against considerable pressure within the pipe line to which the valve is connected, relieving the pressure sufficiently to permit normal force to open the valve member 3, the valve member being shifted forwardly from its seat by the engagement of the rear end of the valve member with the shoulder at the forward portion of the actuating member.

The handle 10 may be easily shifted out of the way, when the valve is either open or closed, by tilting it forwardly about its pivotal axis. The handle may be locked in either the open or closed position by locating it between pairs of lugs 18 and 19 at the outer side of the casing 1 forwardly of the collar 8. The pairs of lugs may have holes, as indicated at 18a in Figs. 1 and 4, and the handle may have a hole 10a for receiving a padlock, not shown, so that the handle may be locked in either open or closed position.

I wish it to be understood that I do not desire to be limited to the exact details of construction shown and described, for obvious modifications will occur to a person skilled in the art.

I claim:

1. A valve of the class described, comprising: a cylindrical valve casing having an annular internal flange providing an opening and an annular seat surrounding the opening adjacent an end of the casing; a valve actuating member coaxial with and axially shiftable within the casing, said actuating member having an axial tubular stem projecting therefrom through said opening; a valve member rotatable and axially slidable on said stem and normally engaging said seat in response to fluid pressure within said end of the casing, said valve member having an outer conical end and a passage extending from its forward to its rearward end, said actuating member having an end engageable with said valve member to unseat the latter; and a cracking valve rotatable in said tubular stem and adapted for axial movement therewith relative to said valve member, said cracking valve having a valve portion normally providing the apex of the conical end of the valve member and seating against the latter, said cracking valve, when shifted axially in one direction, permitting fluid flow through said passage of said valve member.

2. A valve of the class described, comprising: a cylindrical valve casing having an annular internal flange providing an opening and an annular conical seat surrounding the opening adjacent an end of the casing; a valve actuating member coaxial with and axially shiftable within the casing, said actuating member having an axial tubular stem projecting therefrom through said opening; a valve member rotatable and axially slidable on said stem and normally engaging said seat in response to fluid pressure within said end of the casing, said valve member having an outer conical end provided with a conical seat, a bore, and a substantially radial passage extending from its said bore to its rearward end, said actuating member having an end engageable with said valve member to unseat the latter; manually operable means for shifting the actuating member; and a cracking valve rotatable in said tubular stem and adapted for axial movement therewith relative to said valve member, said cracking valve having a valve portion normally providing the apex of the conical end of the valve member and seating against said conical seat of the same, said cracking valve having an annular groove and adapted, when shifted axially in one direction, to permit fluid flow through said groove, said bore and said passage.

References Cited in the file of this patent

UNITED STATES PATENTS

| Number | Name | Date |
|---|---|---|
| 490,227 | Ferrell | Jan. 17, 1893 |
| 760,594 | Wiesebrock | May 24, 1904 |
| 872,797 | Chambers | Dec. 3, 1907 |
| 957,448 | Taylor | May 10, 1910 |
| 1,004,446 | Lundy | Sept. 26, 1911 |
| 1,064,376 | Race | June 10, 1913 |
| 1,300,280 | Kneass | Apr. 15, 1919 |
| 1,585,163 | Milner | May 18, 1926 |
| 2,076,411 | Nelson | Apr. 6, 1937 |
| 2,370,182 | Morrow | Feb. 27, 1945 |
| 2,521,490 | Strauss | Sept. 5, 1950 |

FOREIGN PATENTS

| Number | Country | Date |
|---|---|---|
| 12,505 | France | Feb. 8, 1910 |
| 40,546 | France | Apr. 19, 1932 |
| 619,162 | Germany | Sept. 24, 1935 |
| 61,621 | Denmark | Nov. 29, 1943 |